Patented May 28, 1929.

1,714,838

UNITED STATES PATENT OFFICE.

DAVID S. ANDERSON, OF LONGWOOD, FLORIDA.

METHOD OF PREPARING FOLIAGE.

No Drawing. Application filed January 20, 1926, Serial No. 82,599. Renewed October 24, 1928.

This invention relates to a method of preparing *Asparagus plumosus* ferns and foliage for use in floral or decorative work, one of the objects of the invention being to preserve the material in a flexible and fluffy condition for many months, said method also providing a means for imparting to the material a desired color.

Heretofore it has been the practice when preparing such foliage, to first dye the foliage in the regular way and thereafter impregnate it with a solution of calcium chloride. It has been found in practice, however, that this method connot be used successfully in preparing *Asparagus plumosus* ferns because the same would not retain their natural fluffy appearance and would not retain the coloring matter used in the dyeing process. This has been due primarily to the fact that the heat required with ordinary dyeing methods, tends to leave the foliage in unsatisfactory condition for the purposes intended.

It is an object of the present invention to provide a method whereby the natural appearance of the material can be retained and, if desired the natural color or any other color can be imparted thereto, the said material retaining these characteristics for many months after the treatment.

With the foregoing and other objects in view the invention requires the use of three solutions as follows:

Solution A.

Dissolve calcium chloride ($CaCl_2$) in water ($H_2O$) to produce aproximately 50 gallons of the solution having a density of 30° Beaumé. The solution is allowed to settle after which it is decanted or filtered. To the solution is then added a sufficient quantity of acetic acid ($C_2H_4O_2$) to show neutral or slightly acid by a test with litmus paper or other means. To this preparation are then added 475 c. c. of alcohol, either methyl ($CH_3OH$) or ethyl ($C_2H_5OH$). Thereafter 1900 c. c. of glycerin ($C_3H_5(OH)_3$) are added.

Solution B.

This solution includes 750 grams of cane sugar or sucrose, acacia, gum arabic or arabin having the formula $C_{12}H_{22}O_{11}$, dissolved in 7,600 c. c. of water, the solution being added to twenty-five gallons of Solution A. This Solution B constitutes a dye bath.

Solution C.

This solution consists of 55 grams of camphor ($C_{10}H_{16}O$) added to 4,268 c. c. of alcohol (either methyl or ethyl). After the camphor has been thoroughly dissolved there are added to the solution 225 c. c. of acetic acid. Three hundred grams of aniline dye are then added and the preparation is agitated until all of the dye has become dissolved. Said preparation is then filtered to remove any residue and the filtered solution thus obtained is mixed with 675 c. c. of acetic acid which has been mixed with 1600 c. c. of water.

The foliage to be prepared is first treated by leaving it submerged in solution A for a period of approximately ten days so as thus to become cured. The color of the foliage will at the same time be changed from green to a light brown, such change indicating when this particular step of the process of treatment is completed. If preferred the foliage can be subjected to the action of a partial vacuum so as to open the cells of the material after which the solution can be forced into the cells. This latter process would greatly reduce the time required for completing the first stage of the method.

After a certain quantity of the material has been treated with Solution A, as described, said material is removed, and allowed to drain, the excess fluid returning to the container from which it has been removed so that Solution A may be used repeatedly by replenishing it as found necessary.

Between 150 and 300 c. c. of Solution C are added to every 18 gallons of Solution B, this mixture being placed in a vat and heated to a temperature of 190° F. or higher, according to depth of shade or finish desired. The material removed from the Solution A is placed in the vat containing the mixture of Solutions B and C so as to be completely immersed. This material is stirred or agitated so as to allow the liquid to circulate thoroughly therethrough. The material is left in this mixture of Solutions C and B for about fifteen minutes or longer after which the material is removed, the surplus liquid permitted to drain back into the vat or other container, and the material placed in another vat or container containing a cold or lukewarm quantity of Solution B which has been reduced by the addition of water, to 8° more or less Beaumé.

By following this particular step the density of the solution is reduced at once on the material and to a certain depth in the material so that the treated material will dry more rapidly and the danger of the same becoming damp or sweaty is greatly reduced. This last step of the method also prevents oxidation and deterioration. Thereafter the material is removed and dried and is ready for use.

It has been found that foliage, and especially *Asparagus plumosus* ferns when treated by the method herein described remains flexible and fluffy for many months, retaining its natural appearance and being especially desirable for use in various floral or decorative works.

It is to be understood that the quantities of different ingredients herein mentioned are approximate and they may be varied somewhat without materially changing the nature of the preparation used in the treatment of the foliage.

What is claimed is:

1. The herein described method of treating foliage which consists in impregnating the same with a curing and color changing solution containing calcium chloride, acetic acid, glycerin and alcohol; thereafter immersing the foliage in a solution comprising the foregoing ingredients, aniline dye and gum arabic mixed with camphor, alcohol, acetic acid and water, and finally immersing the foliage in a water solution of gum arabic and aniline dye mixed with an amount of the curing and color changing solution.

2. The herein described method of treating foliage which utilizes a first solution of calcium chloride, acetic acid, glycerin and alcohol in water, a second solution made up of a portion of the first solution and gum arabic, and a third solution consisting of aniline dye and camphor dissolved in alcohol, acetic acid and water, all mixed with a portion of the second solution; said method consisting in first impregnating the foliage in the first solution, removing the foliage from the first solution and subjecting it to the action of a mixture of the second and third solutions while subjected to a temperature at or above 190° F., and subsequently subjecting the foliage to a cool bath of the second solution.

In testimony that I claim the foregoing as my own, I have hereto affixed my signature.

DAVID S. ANDERSON.